May 31, 1932.   H. B. CRANSHAW   1,860,925
FIRESET
Filed Jan. 27, 1930
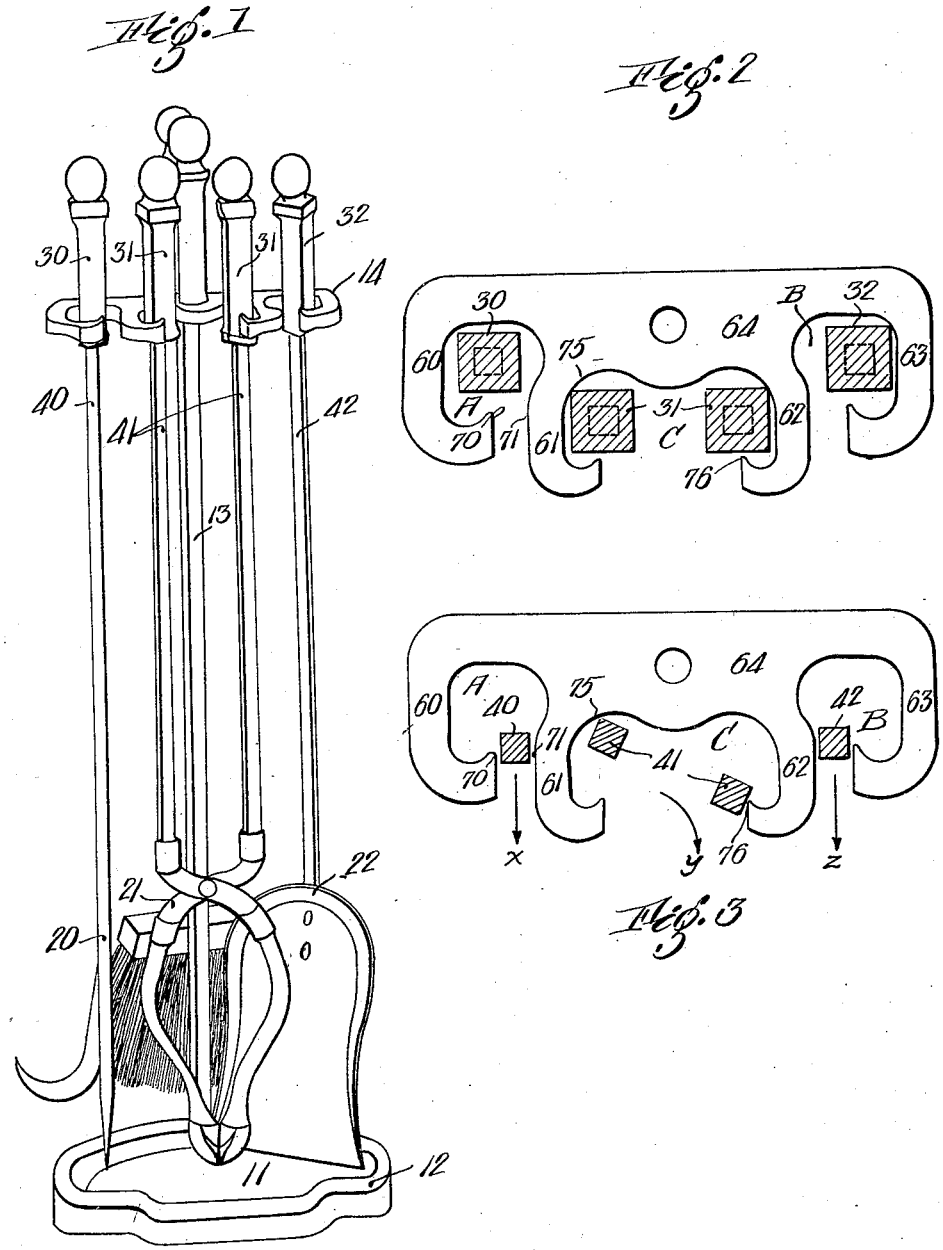
Inventor
Harold B. Cranshaw
by Roberts, Cushman & Woodberry
Attys.

Patented May 31, 1932

1,860,925

UNITED STATES PATENT OFFICE

HAROLD B. CRANSHAW, OF WEST NEWTON, MASSACHUSETTS, ASSIGNOR TO CUTTER MANUFACTURING COMPANY, OF EVERETT, MASSACHUSETTS, A CORPORATION OF MASSACHUSETTS

FIRESET

Application filed January 27, 1930. Serial No. 423,876.

This invention relates to firesets comprising a holder and one or more fireplace implements removably retained therein, and has for one of its objects to hold the implement or implements securely in an upright position yet to permit lateral removal thereof in an easy manner. Additional features of advantage and novelty will be apparent from the following explanation of a specific instance of the invention shown in the accompanying drawings by way of example only.

In the preferred and illustrated embodiment of my invention my improved holder is utilized in combination with a stand which supports the holder at a convenient and appropriate height above the floor. My fireset may however, if desired, comprise one or more fireplace implements retained in the improved manner of my invention by a holder suitably supported from a wall.

In the drawings:

Fig. 1 is a perspective view of a fireset embodying my invention;

Fig. 2 is a sectional view on the line 2—2 of Fig. 1;

Fig. 3 is a sectional view similar to Fig. 2, but showing two of the implements raised somewhat and in the process of being removed from the stand.

In the illustrated embodiment of the invention, referring to Fig. 1, the stand of the fireset illustrated comprises a stand base 11 upon which the various fireplace implements are adapted to rest, the base having a raised margin 12, adapted to confine the lower portions of the implements, and prevent their sliding from the base. An upright member 13 carries near its top a holder 14 which serves to restrain the upper ends of the implements and prevent them from falling over. In the present embodiment of the invention I have illustrated three fireplace implements, a log-roller 20, tongs 21, and a shovel 22, as removably held by the stand. These implements are provided at their upper ends with enlarged handles 30, 31 and 32 respectively and have intermediate their ends shank portions of reduced cross-sectional extent 40, 41 and 42 respectively. As shown in Fig. 1, the enlarged handles of the implements are loosely enlarged by the holder 14, so that the implements may be raised to bring their reduced shank portions to the level of the holder to permit removal of the implements as described below.

Referring to Fig. 2, the holder 14 comprises four horizontally disposed generally hook-like elements 60, 61, 62 and 63, elements 60 and 61 being spaced from each other on one side of the holder and in inwardly directed positions, and elements 62 and 63 being laterally spaced from each other at the other side of the holder and in reversed position with respect to elements 60 and 61. A rear element 64 integrally conjoins the hook-like elements and is engaged and retained by the upright member 13 which may extend therethrough. Hook-like member 60 cooperates with hook-like member 61 to enclose a hand receiving space A through which handle 30 is adapted to extend; members 63 and 62 cooperate to form a similar space B for handle 32, and the two inner hook-like elements 61 and 62 cooperate to enclose a space C for the two handles 31, of the tongs. As shown in Figs. 2 and 3, each of the spaces A, B and C has a horizontally extending outlet between the hook-like elements which enclose the space.

Referring to Fig. 2, it will be seen that the handles of the implements can not be removed laterally through the outlets due to the configuration of the interior surfaces of the parts of the holder which enclose the handle receiving spaces. For example, opposed points 70 and 71 on the interior surface of the holder at opposite sides of the outlet of space A are spaced closer together than the outside dimension of the enlarged handle 30 of the log-roller 20, and thus extend in front of the handle and prevent its lateral removal through the outlet, and opposed points 75 and 76 on the interior surface of the portion of the holder enclosing space C are closer together than the outside dimensions of the pair of handles 31 of the tongs. Accordingly, as shown in Fig. 2, the implements are securely retained within the stand.

Referring to Fig. 3, the implements are each shown as lifted to bring the reduced parts of their shanks to the level of the holder 14. In this elevated position the reduced portions of the shanks, since considerably smaller in lateral dimensions than the enlarged handles, easily clear the spaced opposed points referred to above, and may be removed laterally from the holder as indicated by the arrows $x$, $y$, and $z$. The outlet in the holder for the tongs may be wide enough to pass the tongs in any angular position when lifted but as shown in the figures the outlet is narrower so that even when lifted the tongs must be turned to the angular position shown in Fig. 3 before they can be passed through the outlet.

This improved construction insures that the implements will not become accidentally disengaged from the stand, since the implements must be lifted before disengagement from the stand can take place. While I have shown and described a construction in which the enlarged portions of the implements comprise the handles, it will of course be understood that the invention, in its broader aspect, comprehends any construction in which the portions of the implements opposite the outlets of the holder, when the implements are resting on the base, are larger than the outlets, with lower portions smaller than the outlets, whereby the implements may be laterally removed through the outlets only by first lifting the implements.

I claim:

An implement holder for firesets adapted to embrace and removably retain the handles of a plurality of fireplace implements having shank portions of reduced cross-sectional dimensions, said holder comprising four horizontally disposed hook-like elements, two of said elements being laterally spaced from each other on one side of the holder, and the other two of said elements being laterally spaced from each other at the other side of the holder and in reversed position with respect to the first two elements, each of said hook-like elements being inwardly directed, and a rear element integrally conjoining the stems of the hook-like elements and adapted to engage an upright support, each of the outer hook-like elements cooperating with its adjacent hook-like element to enclose a handle-receiving space having an outlet for the passage of a reduced shank of an implement, and the two inner hook-like elements cooperating to define a larger partially enclosed space for receiving the handle portion of fireplace tongs.

Signed by me at Boston, Massachusetts, this 23rd day of January, 1930.

HAROLD B. CRANSHAW.